United States Patent [19]

Cloutier et al.

[11] Patent Number: 4,578,687

[45] Date of Patent: Mar. 25, 1986

[54] INK JET PRINTHEAD HAVING HYDRAULICALLY SEPARATED ORIFICES

[75] Inventors: Frank L. Cloutier, Corvallis; Paul H. McClelland, Monmouth; William R. Boucher, Corvallis; Gary L. Siewell, Albany, all of Oreg.

[73] Assignee: Hewlett Packard Company, Palo Alto, Calif.

[21] Appl. No.: 588,016

[22] Filed: Mar. 9, 1984

[51] Int. Cl.[4] ............ G01D 15/18

[52] U.S. Cl. ............ 346/140 R

[58] Field of Search ............ 346/140

[56] References Cited

U.S. PATENT DOCUMENTS

| | | | |
|---|---|---|---|
| 3,747,120 | 7/1973 | Stemme | 346/140 X |
| 3,930,260 | 12/1975 | Sicking | 346/140 |
| 4,201,995 | 5/1980 | Fischbeck | 346/140 |
| 4,438,191 | 3/1984 | Cloutier | 346/140 X |
| 4,490,728 | 12/1984 | Vaught | 346/140 X |

*Primary Examiner*—Joseph W. Hartary
*Attorney, Agent, or Firm*—William H. MacAllister; William J. Bethurum

[57] ABSTRACT

An orifice plate for an ink jet printhead wherein a plurality of elongated isolator slots are adjacent the orifices and in fluid communication therewith, so as to prevent cross-talk between adjacent orifices.

6 Claims, 2 Drawing Figures

SECTION A-A, SHOWING SLIT IN CROSS SECTION

SECTION A-A, SHOWING
SLIT IN CROSS SECTION

INK JET PRINTHEAD HAVING HYDRAULICALLY SEPARATED ORIFICES

BACKGROUND OF INVENTION

The rapidity of modern-day data processing imposes severe demands on the ability to produce a printout record at very high speed. Impact printing, in which permanently shaped character elements physically contact a recording medium, has been found to be too slow, too bulky, and too noisy for many applications. Thus, the industry has turned to other alternatives involving non-impact printing schemes using various techniques to cause a desired character to be formed on the recording medium. Some of these involve the use of electrostatic or magnetic fields to control the deposition of a visible character-forming substance, either solid (i.e., dry powder) or liquid (i.e., ink) on the medium which is usually paper. Other systems utilize electrophotographic or ionic systems in which an electron or ion beam impinges on the medium and causes a change in coloration at the point of impingement. Still another system employs a thermal image to achieve the desired shape coloration change. Of more recent import is a printing technique, called ink jet or ink bubble printing, in which tiny droplets of ink are electronically caused to impinge on a recording medium to form any selected character at any location at high speed, each character being made up of a plurality of such droplets or dots. The present invention relates to this kind of printing system.

In the co-pending application, Ser. No. 292,841, entitled THERMAL INK JET PRINTER, filed Aug. 14, 1981 now abandoned by John L. Vaught et al. and assigned to the instant assignee, an ink-on-demand printing system is described which utilizes an ink-containing capillary having an orifice from which ink is ejected. Located closely adjacent to this orifice is an ink-heating mechanism which may be a resistor located either within or adjacent to the capillary. Upon the application of a suitable current to the resistor, it is rapidly heated. A significant amount of thermal energy is transferred to the ink resulting in vaporization of a small portion of the ink adjacent the orifice and producing a bubble in the capillary. The formation of this bubble in turn creates a pressure wave which propels a single ink droplet from the orifice onto a nearby writing surface or recording medium. By properly selecting the location of the ink-heating mechanism with respect to the orifice and with careful control of the energy transfer from the heating mechanism to the ink, the ink bubble will quickly collapse on or near the ink-heating mechanism before any vapor escapes from the orifice.

Thermal ink jet printheads may comprise a type in which the resistors are located on a substrate support member which is affixed to and aligned with a separate orifice plate with each orifice being positioned to cooperate with a discrete resistor in forming and ejecting an ink droplet. Separate barriers or hydraulic separators may also be provided as discrete components between the substrate and the orifice plate. Typical of this type of printhead structure is that shown and described in the co-pending application of Buck et al., Ser. No. 490,754, now U.S. Pat. No. 4,500,895 filed on May 2, 1983 and entitled DISPOSABLE INK JET HEAD.

In another type of printhead the resistors for each orifice may be actually formed on the orifice plate itself as integral parts thereof. This form of thermal ink jet head is shown and described in the co-pending application of Cloutier et al., Ser. No. 443,972, filed on Nov. 23, 1982 entitled ORIFICE PLATE/RESISTOR COMBINATION. In another co-pending application of Cloutier et al., Ser. No. 443,980, filed on the same date now U.S. Pat. No. 4,528,577 entitled INK JET ORIFICE PLATE HAVING INTEGRAL SEPARATORS, the hydraulic separators are also shown as integral with the orifice plate. The present invention relates particularly to a printhead structure which, in the preferred embodiment thereof, has the hydraulic separators formed as an integral part of the orifice plate, while the resistors are formed on a substrate member. The invention may, however, be utilized to advantage with structures in which the resistors are formed on the printhead orifice plate as well as any other type of ink jet printer where ink droplets or bubbles may be ejected from orifices by other than by the use of resistors. Typical of such other systems is that described and shown in U.S. Pat. No. 3,832,579 entitled POST DROPLET EJECTING SYSTEM wherein ink is ejected from a nozzle by means of a piezo-electric transducer. Still another system is described in U.S. Pat. No. 3,179,042 entitled SUDDEN STEAM PRINTER wherein electric current is passed directly through the ink itself which are contained in a number of tubes. Because of the high resistance of the ink, it is heated so that the portion in the tube thereof is expelled.

In ink jet printheads, and particularly the type to which the present invention relates, a phenomenon, commonly called "cross-talk", is encountered in which ink is ejected by the printhead from an orifice whose respective resistor has not been energized. This phenomenon arises when enough ink is pumped out of a non-fired orifice by the additive pumping action of previously fired resistors in the printhead. This pumping action causes the fluid to break free of the orifice plate in the nonfired orifices and land on the paper being printed. A line of text printed by such a head encountering this phenomenon will exhibit a random sprinkling of ink droplets superimposed on the text, seriously degrading the quality of the printing. In instances where all the resistors are being fired, an orifice-to-orifice consistency problem has been observed. Here the problem appears as a horizontal "banding" in which a variation in the print density in a block of fully-dense graphics occurs. It has been determined that the character of such banding results from the firing order of the resistors in the head and is caused by the fluid flow patterns in the head which are created in turn by the expansion and collapse of the vapor bubbles. These fluid flow patterns interfere either constructively or destructively with further firings of resistors in such a way as to alter the volume of fluid ejected by one particular orifice in a systematic way. While this effect can be reduced to some extent by prudent selection of the resistor firing order and the firing repetition rate, it is difficult to completely eliminate the problem by this route. The effect of firing order on print consistency is so great that it is possible to almost completely inhibit the ability of one orifice to eject an ink droplet when desired by timing the firing of its neighboring resistors so that collapse coincides with the other orifice's bubble expansion. By the basic rules of hydraulics the principal cause of the two problems described hereinabove is the noncompliant coupling of the fluid in any one orifice with the fluid in all the other orifices in the head. It is, therefore, highly desirable, and an objective of the present invention, to accomplish the decoupling of the dynamics of fluid motion in and near each individual orifice so that the bubble explosion, collapse and orifice refill processes occurring at one nozzle will not perturb those processes at other nozzles in the head. These problems may also be viewed as resulting from the difficulty in precisely controlling the energy imparted to each droplet so that upon ejection from one orifice, hydraulic energy excesses are dissipated through adjacent orifices.

Solutions to this "cross-talk" problem have been sought in various ways. For example, in the aforementioned pending application of Vaught et al., physical barriers between resistor/orifice pairs are provided. In the co-pending application of Tacklind, Ser. No. 419,658, filed Sept. 20, 1982 entitled METHOD AND APPARATUS FOR ELIMINATING ACOUSTIC CROSS-TALK and assigned to the instant assignee, a pattern-generating or multiplexing system for energizing the various resistors is disclosed. Orifice menisci null times are determined at which the effect of a previously ejected ink droplet will have little or no influence on subsequent ejections from other orifices. In U.S. Pat. No. 4,334,234 to Shirato et al. entitled LIQUID DROPLET FORMING APPARATUS, another solution is taught wherein communicating ports are provided between the actuating chamber (i.e., the particular cavity adjacent to an orifice for directly supplying ink to the orifice) and an intermediate ink chamber, the ratio of the area of the region of the inside wall surface of the intermediate chamber to the total opening area of the communicating ports is 50–300. In U.S. Pat. No. 4,338,611 to Eida et al. for liquid jet recording head, the printhead is constructed so that the following dimensional relationship is established:

$$1/100 = a/b = \tfrac{1}{2}$$

when the length from the orifice to the inlet port is L; the length of the energy acting zone is 1; the length of the orifice to the energy acting zone is a; and the length from the inlet port to the energy acting is b. L is held to be not less than 0.1 mm and not more than 5 mm and 1 is not less than 10 μm and not more than 800 μm.

The solution of the Shirato et al. and the Eida et al. patents attempts to decouple adjacent orifices by a manifolding technique to isolate neighboring orifices which are supplied with ink from a common ink source through individual feed tubes (ports). As can be seen, the length of these feed tubes is carefully chosen so that the inertia of ink entrained within a tube is sufficient to prevent large scale fluid displacements back into the supply line or feed tube (and hence to other feed tubes) when an ink droplet is ejected. The inertial isolation of orifices in this manner has several disadvantages. First, the extra feed tube length required to accomplish sufficient inertial isolation introduces an excessive fluid drag in the ink supply to the orifices, slowing down the rate at which they can be refilled after droplet ejection. Furthermore, the inertia of the entrained fluid in the feed tubes must be overcome in order to refill the orifices after ink ejection, since the inertia is, in effect, in series with the fluid circuit connecting the orifices with their supply of ink. This further restricts the rate at which the orifices can be refilled and hence further limits how fast the orifices can be repetitively operated (or "fired").

In the co-pending application of Allen et al., Ser. No. 490,753 filed May 2, 1983 entitled FLUIDIC TUNING OF IMPULSIVE JET DEVICES USING PASSIVE ORIFICES, and assigned to the instant assignee, another solution to cross-talk is described. In this approach the orifice plate is provided with "passive" or non-firing openings of various sizes and shapes. These non-firing openings are provided in the orifice plate adjacent to the active or firing orifices which are taught to be of the order of 0.003 inches (about 77 microns) in diameter. The diameter of the passive or non-firing openings is said to be of the order of the diameter of the firing orifices (thus being about 77 microns). In the co-pending application of Vaught, Ser. No. 490,684 filed May 2, 1983 entitled IMPULSE JET DEVICE HAVING INCREASED REPETITION RATE, assigned to the instant assignee, the firing orifices and the passive non-firing orifices are disclosed as having diameters on the order of 50 microns.

BRIEF SUMMARY OF THE INVENTION

The present invention is intended for use in a printhead structure as disclosed in co-pending application Ser. No. 490,754 to Buck et al., filed May 2, 1983 now U.S. Pat. No. 4,500,895 and entitled DISPOSABLE INK JET HEAD. More specifically, the orifice plate itself is substantially the same as the orifice plate shown and described in the aforementioned co-pending application to Cloutier et al., Ser. No. 443,980 filed Nov. 23, 1982 now U.S. Pat. No. 4,528,577. The present invention provides a plurality of non-firing or passive openings in the orifice plate which are in the shape of narrow slots. These non-firing or passive openings will hereinafter be referred to as slots since it has been discovered that the preferred form for these openings is approximately rectangular or slot-like. A single slot is provided adjacent to each pair of firing orifices for cooperation therewith to secure the advantages of the invention. The spacing between the firing orifices and the slots is approximately 370 to 400 microns center-to-center. These slots provide a compliant coupling in the fluid circuit connecting the firing orifices with their common fluid supply or resevoir. When the printhead is properly primed with ink, a meniscus of ink wells up in each slot. The meniscus integrates fluid flow into the slot against the non-linear opposing force supplied by surface tension and stores work expressed as a displacement of the meniscus. When the pressure which drives fluid out of the slot by enlarging the meniscus is removed, surface tension retracts the meniscus to its zero displacement position and thereby pumps fluid back through the slot and into the supply line leading from the firing orifices to the fluid resevoir. On the other hand, the meniscus wells up into the slot due to the work required to enlarge the meniscus when a droplet is formed in an adjacent firing orifice.

Placing such a slot opposite the feed line leading from the common ink supply to each individual resistor/orifice combination absorbs the propogation of fluid surges back into the supply from the firing orifices, thus decoupling the dynamics of each resistor/nozzle pair from all other such pairs in the printhead orifice plate. This permits the use of very short fluid feed lines without risking cross-talk or dependency upon a particular firing order. The minimization of feed line length allows fluid drag in the head to be minimized, reducing the effect of fluid drag on the head operating speed. It has been discovered that the slot shape is preferable to circular shapes since it is less prone to eject a droplet itself than is the case for round non-firing orifices. The quantum of stored work can be varied by varying the slot length without necessarily increasing the slot width. This is an important consideration in the design of ink jet printheads since the tendency of such heads to deprime when mechanically shocked increases as the diameter of its orifices or nozzles increase. The isolator slots represent extra orifices in this regard, but its effective diameter is determined primarily by the slot's width. Such a slot resembles a row of closely spaced holes more than it does a single hole or area equivalent to that of the slot. The design of the slot is not limited to the use of the substantially rectangular shape only. The shape of the slot can be tailored to suit the layout of the other elements of the printhead itself. In addition, the number and the location of the isolator slots can be varied to suit particular applications. It has been discovered that in order to prevent cross-talk between adjacent orifices, the width of the slot must not be greater than approximately 5 microns smaller, or greater than 10 microns larger than the diameter of the active orifices or nozzles and the length must be at least six to ten times greater than the diameter of the active nozzles. The resulting active area of the slot thus being six to ten times the active area of the adjacent nozzle.

DETAILED DESCRIPTION OF THE INVENTION

Figure 1:
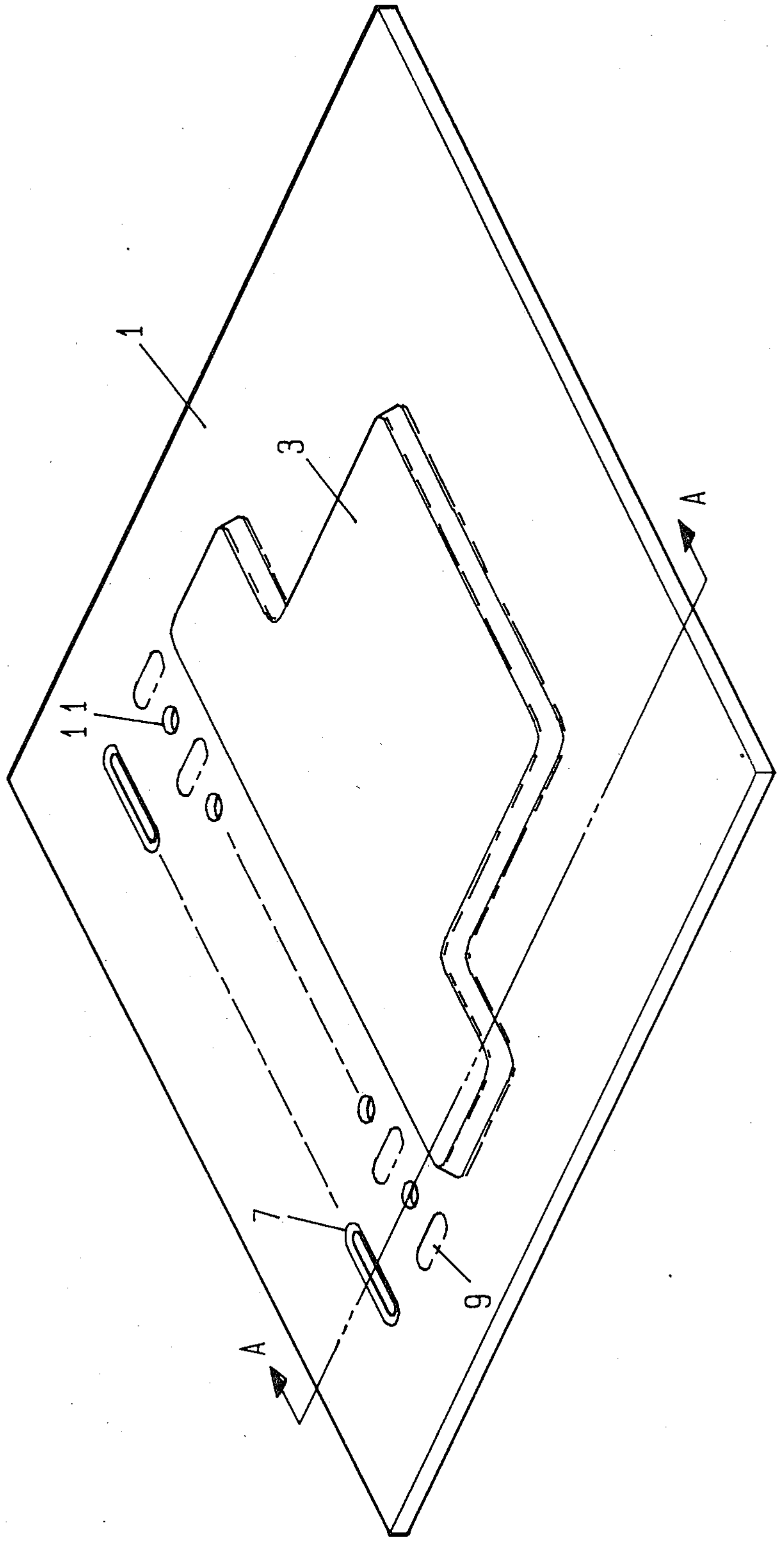
FIG. 1 is a perspective view of an orifice plate containing slots according to the present invention.

Referring now to FIG. 1, an orifice plate 1 is shown as including a plurality of active or firing orifices or nozzles 11 disposed in a row and separated by short wall portions 9 which are formed integral with the orifice plate 1. Also formed integrally as a part of the orifice plate is an ink manifold portion 3 disposed adjacent the firing nozzles 11 for supplying ink to the various orifices in the orifice plate from the underside thereof. The wall members 9 are so formed as to extend between the orifices 11 in a direction at right angles to the row of orifices, there being such a wall between each two orifices. Also formed in the orifice plate 1 are a plurality of slots 7 according to the invention. The principal axis of the slots is parallel to the line of the orifices 11. It has been found advantageous to provide one such slot 7 for each two adjacent orifices 11.

Figure 2:
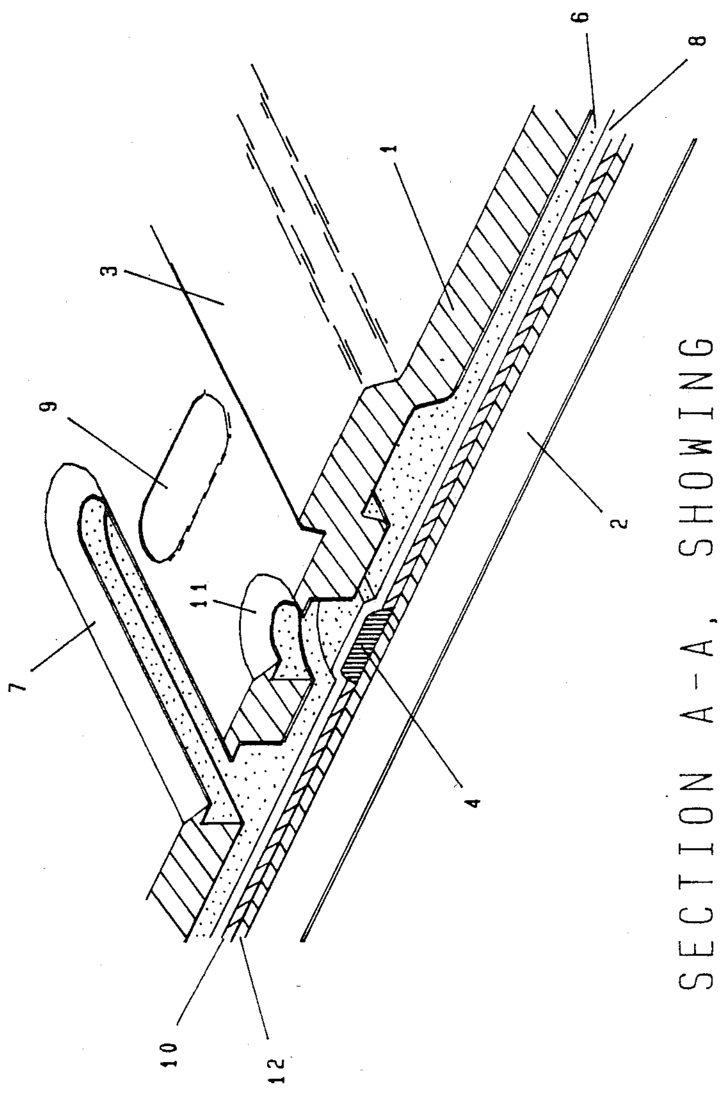
FIG. 2 is a perspective view, partly in section, of the orifice plate shown in FIG. 1 taken along the line A—A thereof.

With reference to FIG. 2, the orifice plate or printhead of the invention is shown in greater detail. The uppermost layer 8 is a passivating layer which may be of silicon dioxide, for example and is provided to protect the underlying layers and principally the resistor 4 which is shown immediately adjacent to and beneath an active or firing nozzle 11. Extending from each side of the resistor 4 is a layer 10 of electrically conductive material for energizing the resistor 4 upon the application of electrical current thereto. The next layer is a heat control layer 12 which may be formed of silicon, ceramic, or silicon dioxide disposed upon the immediate surface of the substrate 2 and beneath the resistor 4 and the electrically-conductive layer 10. The orifice plate 1 is disposed above the passivating layer 8 and is bonded to the underlying substrate structures by means of an adhesive (not shown). In this view the manifold portion 3 is shown as well as a firing orifice 11 and an adjacent isolating slot 9. Within the space between the substrate structures and the orifice plate a volume 6 of ink is also shown.

In the preferred embodiment of the invention the width of the isolating slot 7 is always greater than the diameter of the adjacent firing nozzles while the length of the slot is always at least four times greater than the diameter of the firing nozzles. In this embodiment the diameter of the firing nozzles 11 may be about 55 to 56 microns, for example. Each underlying resistor 4 may be about 110 microns square. The width of the slots 7 is about 60 microns while the length is about 370 microns. In practice it has been found that the width of the slots should not be greater than 5 microns smaller than the diameter of the adjacent firing nozzles 11. The length of the slots may vary from 365 to 380 microns. With an orifice diameter of 55–66 microns, a slot width of less than 50 microns results in the unwanted ejection of ink from the slot adjacent the firing orifice.

There thus has been shown and described an improved orifice plate for ink jet printheads. The isolating slots according to the invention can easily be provided in the basic design of an orifice plate by photolithography at the same step in the fabrication process in which the firing orifices are defined and formed. The incorporation of such isolating slots does not add to the cost or complexity of the orifice plate, nor does it impose major constraints on the printhead architecture as do the isolation schemes of the prior art.

What is claimed is:

1. An improved ink jet printhead comprising an orifice plate affixed to a substrate member so as to permit the flow of a fluid between said orifice plate and said substrate member for selective ejection of said fluid from orifices in said orifice plate, said orifice plate containing a plurality of orifices and a plurality of elongated isolator slots adjacent thereto, said orifices and said isolator slots communicating with said fluid between said orifice plate and said substrate member, said isolator slots having an active area six to ten times the area of said orifices.

2. The invention according to claim 1 wherein said orifices have a diameter of about 55–66 microns, and said isolator slots have a width of at least 50 microns and not greater than about 76 microns.

3. The invention according to claim 2 wherein the length of said isolator slots is from 365 to 380 microns.

4. The invention according to claim 2 wherein the width of said isolator slots is at least 50 microns and not greater than about 76 microns.

5. The invention according to claim 1 wherein an isolator slot is provided for each adjacent pair of orifices.

6. An improved ink jet print head comprising an orifice plate affixed to a substrate member so as to permit the flow of a fluid between said orifice plate and said substrate member for selective ejection of said fluid from orifices in said orifice plate, said orifice plate containing a plurality of orifices and a plurality of elongated isolator slots adjacent thereto, said orifices and said isolator slots communicating said fluid between said orifice plate and said substrate member, and the width of said slots being no more than approximately five microns smaller or greater than ten microns larger than the diameter of said orifices.

* * * * *